United States Patent [19]
Serrano et al.

[11] Patent Number: 6,088,188
[45] Date of Patent: Jul. 11, 2000

[54] SYSTEM AND METHOD FOR DETERMINING WHEN HARD DISK DRIVE POWER AMPLIFIER IS SATURATED

[75] Inventors: Louis Joseph Serrano; Mantle Man-Hon Yu, both of San Jose, Calif.

[73] Assignee: International Business Machines Corporation, Armonk, N.Y.

[21] Appl. No.: 08/798,529

[22] Filed: Feb. 10, 1997

[51] Int. Cl.[7] .................................................. G11B 5/596
[52] U.S. Cl. ................................. 360/78.09; 360/78.06
[58] Field of Search .............................. 360/78.04, 78.06, 360/78.07, 78.09; 318/560, 561; 369/43

[56] References Cited

U.S. PATENT DOCUMENTS

| | | | |
|---|---|---|---|
| 4,133,011 | 1/1979 | Kurzweil, Jr. | 360/78 |
| 4,697,127 | 9/1987 | Stich et al. | 318/561 |
| 4,914,644 | 4/1990 | Chen et al. | 369/43 |
| 5,015,932 | 5/1991 | Wachi | 318/560 |
| 5,119,250 | 6/1992 | Green et al. | 360/78.06 |
| 5,128,813 | 7/1992 | Lee | 360/78.07 |
| 5,305,160 | 4/1994 | Funches et al. | 360/78.07 |
| 5,444,582 | 8/1995 | Suzuki | 360/78.09 |
| 5,793,558 | 8/1998 | Codilian et al. | 360/78.06 |

FOREIGN PATENT DOCUMENTS

| | | |
|---|---|---|
| 0 310 119 | 4/1989 | European Pat. Off. . |
| 0 598 594 A2 | 5/1994 | European Pat. Off. . |
| 60-117459 | 6/1985 | Japan . |
| 1-253881 | 10/1989 | Japan . |
| 2-265079 | 10/1990 | Japan . |
| 3-30157 | 2/1991 | Japan . |
| 3-44875 | 2/1991 | Japan . |
| 5-20808 | 1/1993 | Japan . |
| 5-144204 | 6/1993 | Japan . |
| 7245988 | 9/1995 | Japan . |
| 7-312046 | 11/1995 | Japan . |

*Primary Examiner*—Andrew L. Sniezek
*Attorney, Agent, or Firm*—Gray Cary Ware Freidenrich

[57] ABSTRACT

In a hard disk drive, a head actuator periodically is caused to undertake a calibration seek such that the power amplifier that energizes the head actuator is saturated. The predicted distance moved by the head during the calibration seek is compared to the actual distance moved, and the ratio of the two distances is then used to determine the saturation current of the power amplifier. For a subsequent seek, if the saturation current is less than the current requested for the subsequent seek, the saturation current is input into the head position prediction model. Otherwise, the requested current is used.

15 Claims, 4 Drawing Sheets

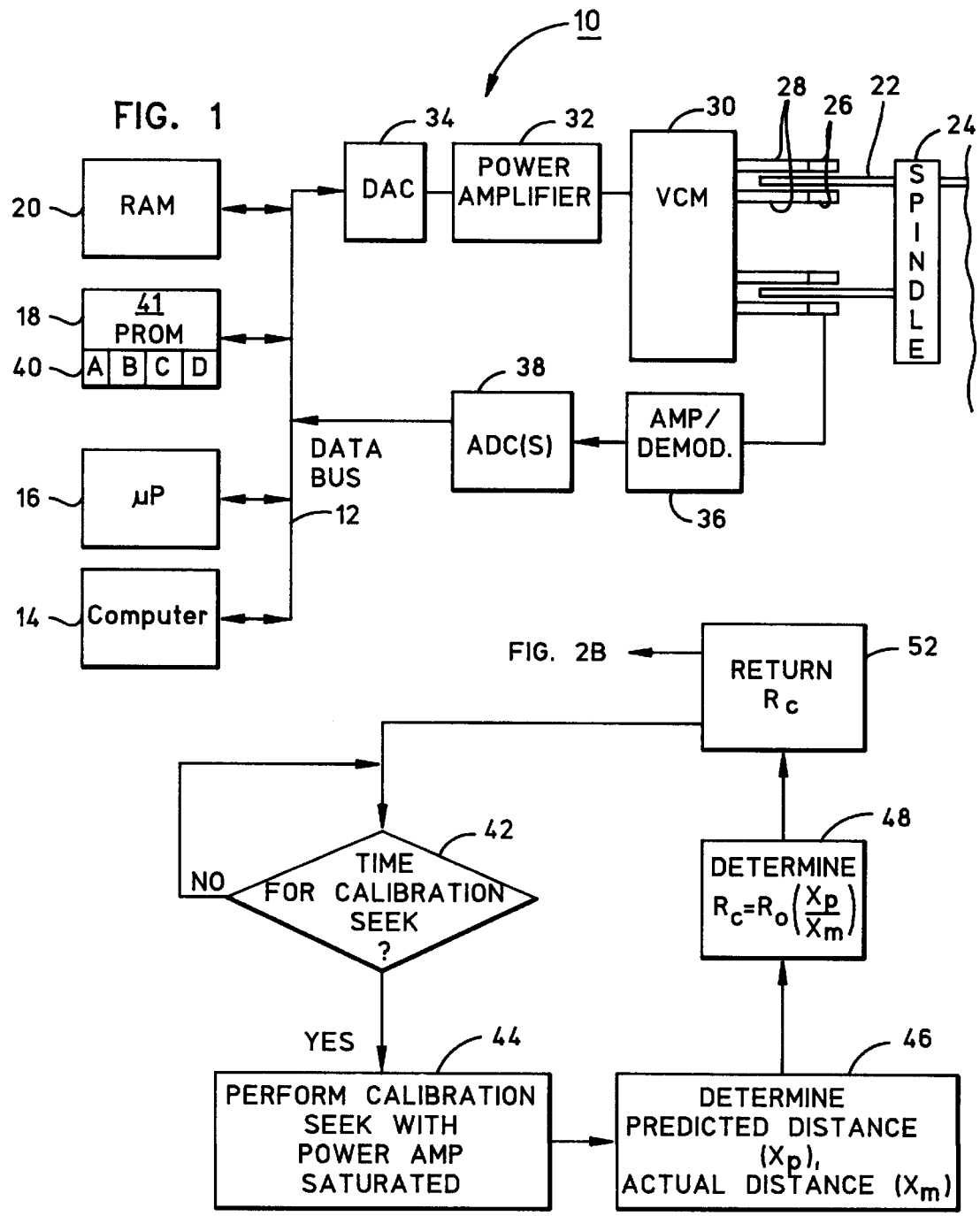

SYSTEM AND METHOD FOR DETERMINING WHEN HARD DISK DRIVE POWER AMPLIFIER IS SATURATED

BACKGROUND OF THE INVENTION

1. Field of the Invention

The present invention relates generally to computer hard disk drives, and more particularly to systems and methods for determining which of two coil current values (estimated and saturated) to use in a head position model.

2. Description of the Related Art

Computer hard disk drives include rotatable disks on which data is stored in concentric data tracks. Data is transferred between the disks and a computer that is external to the hard disk drive via read and write heads within the hard disk drive. The heads are closely spaced from the disks, and are attached to actuator arms which in turn are moved by a voice coil motor (VCM) to move the heads radially relative to the disks. With this structure, as the disks rotate past the heads, the heads can be positioned over an appropriate data track.

Electrical current is supplied to the VCM by a power amplifier. The amount of current supplied depends on the distance through which the heads must be moved. This distance is known to a microprocessor inside the hard disk drive; consequently, the current that is to be requested from the power amplifier is determined by the microprocessor.

It will be appreciated that the microprocessor must precisely control the positioning of the heads to facilitate rapid and accurate head placement, to thereby optimize the rate at which data is transferred to and from the hard disk drive. Accordingly, the movement of the heads must be modelled, to enable the microprocessor to derive an accurate estimate of the position of the heads. From the above discussion, it will be further appreciated that the modelling process accounts for the current supplied to the VCM, because the operation of the VCM and, hence, the position of the heads, depends on the amount of current supplied to the VCM.

It happens that the modelling process cannot simply assume that the requested current is the current actually supplied to the VCM by the power amplifier. This is because the power amplifier can be driven into saturation, in which case the amplifier will output only a saturation current which is less than the requested current. Recognizing this, existing hard disk drive systems use two models for predicting head placement, namely, a linear model that is intended to be used when the power amplifier is not saturated, and a saturated model to be used otherwise. Essentially, the saturation model calculates the saturation current from nominal values for power amplifier voltage, coil resistance, and head velocity, and replaces the requested current input to the linear model with the estimated saturation current.

Accordingly, it is important to know when the power amplifier is saturated, so that the appropriate model can be used. The saturation point of a power amplifier, however, is not necessarily constant. Instead, it can vary with such factors as temperature. Thus, the precise saturation point of the power amplifier ideally is periodically determined, so that the correct model of head movement can be used.

One way to determine precisely when a power amplifier is saturated is to directly measure its output current, digitize it, and then compare it to the requested current value. If the actual current is less than the requested current, the power amplifier is saturated. Unfortunately, this requires that relatively expensive dedicated analog-to-digital converters (ADCs) be incorporated into the hard disk drive.

Recognizing the above problem, U.S. Pat. No. 4,914,644, owned by the present assignee, discloses a method for determining when the power amplifier is saturated based on the difference between the requested head velocity and the estimated head velocity, without requiring dedicated ADCs to do so. While effective for its intended purpose, it happens that the '644 model might not detect unexpected power amplifier saturation, particularly during head deceleration. The present invention, however, recognizes that it is possible to provide an accurate and precise determination of when a power amplifier is saturated, and to provide information to the head position model to improve is predictive abilities. This information can take the form of an estimate of the current actually supplied to the voice coil, or simply as knowledge that the requested current is larger than the available current.

Accordingly, it is an object of the present invention to provide a system for determining when a power amplifier in a computer hard disk drive is saturated. Another object of the present invention is to provide a system for improving the predictive ability of a head position model in a hard disk drive. Yet another object of the present invention is to provide a cost-effective, easy to use system for determining when a power amplifier in a hard disk drive is saturated.

SUMMARY OF THE INVENTION

A microprocessor for improving a head position model in a hard disk drive includes computer code for determining when the power amplifier of the disk drive is saturated, and providing information to the head position model to improve the accuracy of the model's prediction, based on the determining step. More particularly, the microprocessor periodically undertakes a seek such that the power amplifier is saturated, and the distance through which the heads of the drive actually move is compared to the distance predicted by the model to thereby generate, in combination with a value for nominal resistance of the power amplifier, a saturation resistance of the power amplifier. For subsequent seeks, during each servo sample a saturation current is determined based on the saturation resistance. The current that is requested to undertake the seek is then compared to the saturation current, and the requested current is used in the model to predict head movement when the requested current is less than the saturated current. Otherwise, the saturated current is input to the model.

In another aspect of this invention, a microprocessor is disclosed for inputting information to a head movement estimation model in a hard disk drive that includes at least one data storage disk and at least one head juxtaposed with the disk. Also, the hard disk drive includes an actuator that is connected to the head and a power amplifier coupled to the actuator for energizing the actuator to move the head relative to the disk.

As disclosed in detail below, the microprocessor includes a data storage device including a computer usable medium having computer usable code means for determining whether the power amplifier is saturated. In accordance with the present invention, the computer usable code means includes computer readable code means for causing the power amplifier to move the actuator in a calibration seek such that the power amplifier is saturated. Also, computer readable code means determine a predicted distance of head movement for the calibrated seek.

Additionally, computer readable code means are provided for determining an actual distance of head movement for the calibrated seek. Moreover, computer readable code means determine a saturation current, based on the predicated distance and actual distance, and computer readable code means receive a requested current and cause the model to use the least of: the saturation current, and the requested current.

In a preferred embodiment, the microprocessor determines the saturation current using the ratio of the actual and predicted distances. More preferably, the disk includes gray code data, and the microprocessor determines the actual distance of head movement using the gray code data. Then, the microprocessor determines the saturation current using a nominal saturation voltage and a nominal power amplifier resistance. With this inventive combination, the saturation current is used during at least some decelerations of the head. The microprocessor is disclosed in combination with the hard disk drive, and in further combination with a computer that is electrically connected to the hard disk drive.

In another aspect, a computer-implemented method is disclosed for selecting a head movement estimation model in a hard disk drive which includes at least one head and a power amplifier for causing the head to move. In accordance with the principles disclosed herein, the method includes saturating the power amplifier to cause the head to move an actual distance, and determining a predicted distance. Then, based on the predicted distance and the actual distance, the current value is determined and used to predict head movement.

In still another aspect, a program device includes a computer program storage device that is readable by a digital processing apparatus, and a program means on the program storage device. The program means includes instructions which are executable by the digital processing apparatus for performing method steps for determining saturation of a power amplifier in a hard disk drive including a head movement estimation model. These method steps include causing the power amplifier of the drive to move the actuator of the drive in a calibration seek such that the power amplifier is saturated. Moreover, the method includes determining a predicted distance of head movement for the calibrated seek, and determining an actual distance of head movement for the calibrated seek. A saturation current is then determined based on the predicted distance and actual distance, and head movement is predicted in response to the determination of the saturation current.

In an alternate embodiment, a hard disk drive includes a circuit for generating a signal representative of the difference between a requested coil current and the actual coil current. A comparator receives this signal and compares it to a threshold. Each servo sample, the microprocessor reads the output of the comparator, and decreases the requested current used by the head position model when the threshold is exceeded. The signal can represent the voltage across the coil.

In another aspect of the alternate embodiment, a hard disk drive includes at least one data storage disk and at least one head juxtaposed with the disk. Also, the hard disk drive includes an actuator connected to the head and a power amplifier coupled to the actuator for energizing the actuator to move the head relative to the disk. A microprocessor in the hard disk drive determines a requested current of the power amplifier. The drive includes a circuit for generating a feedback signal representative of a power amplifier input signal, e.g., the requested current, and a power amplifier output signal, e.g., the actual current output by the power amplifier. A comparator receives the feedback signal and compares it to a threshold. Computer readable code means associated with the microprocessor decrease the requested current when the feedback signal exceeds the threshold. In one embodiment, the input and output signals represent the requested current and actual output current of the power amplifier, respectively; in another embodiment, the input and output signals represent the voltage across the power amplifier.

In another aspect of the alternate embodiment, a method is disclosed for establishing the output current of a power amplifier in a hard disk drive. The method includes the steps of generating a feedback signal based on a difference signal across the power amplifier, and comparing the feedback signal to a threshold. A requested power amplifier current is decreased when the feedback signal exceeds the threshold.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the hard disk drive of the present invention;

FIG. 2A is a flow chart showing the preferred method for determining the saturation resistance of the power amplifier of the hard disk drive shown in FIG. 1;

DETAILED DESCRIPTION OF THE PREFERRED EMBODIMENTS

Figure 2B:
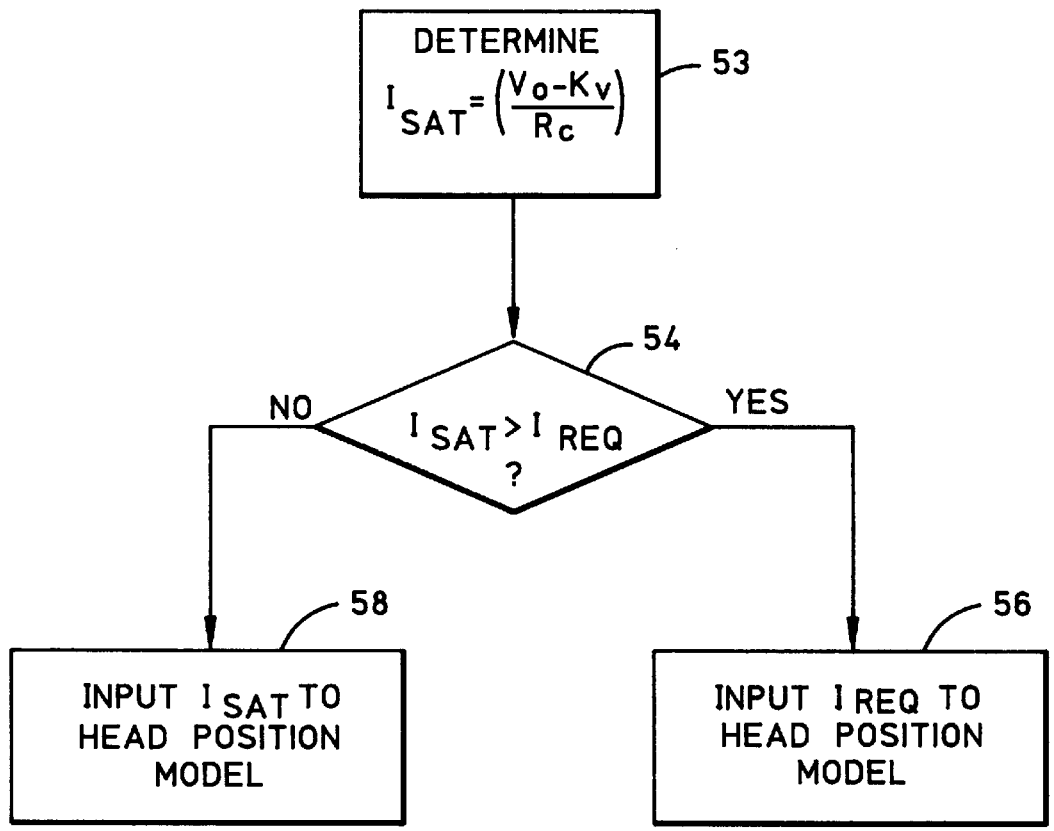
FIG. 2B is a flow chart showing the method for selecting the appropriate current value to use in the estimation model, based on the results of the process shown in FIG. 2A.

Referring initially to FIG. 1, a hard disk drive is shown, generally designated 10, which includes a data bus 12 with which an associated computer 14, such as a personal computer made by International Business Machines Corporation, Armonk, New York, is in communication in accordance with principles well-known in the art for transferring data between the computer 14 and the hard disk drive 10. As shown, the hard disk drive 10 includes a microprocessor 16 and one or more program storage devices, such as a programmable read-only memory (PROM) 18 and a random access memory (RAM) 20, all of which devices communicate with the data bus 12.

FIG. 1 also shows that the hard disk drive 10 includes plural data storage disks 22 that are connected to a rotatable spindle 24. Read/write heads 26 are closely juxtaposed with respective disks 22 as shown for transferring data to and from the disks 22. Each head 26 is attached to a respective arm 28, and the arms 28 are attached to a voice coil motor (VCM) 30 which moves the arms 28 radially across the disks 22. Together, the VCM 30 and arms 28 establish respective actuators for moving the heads 26.

A power amplifier 32 is electrically connected to the VCM 30. The power amplifier 32 supplies electrical current to the VCM 30 to activate the VCM 30 and thereby move the heads 26 relative to the disks 22 in accordance with well-known principles. To establish the amount of current that the power amplifier 32 outputs to the VCM 30, the microprocessor 16 first determines the amount of current (referred to herein as "requested current") that is appropriate for moving the heads 26 to the desired data track on the disks 22. Then, the microprocessor outputs a signal representative of the requested current, and this signal is converted from digital format to analog format by a digital to analog converter (DAC) 34 and sent to the power amplifier 32. Although not required by the present invention, the hard disk drive 10 can also include an amplifier/demodulator 36 that is electrically connected to the heads 26, and one or more analog to digital converters (ADC) 38 that digitize the signal from the amplifier/demodulator 36 and send the digitized signal to the data bus 12 as shown.

In accordance with the present invention, the hard drive 10 includes a saturation module 40 which can be executed by a processor, such as the microprocessor 16, as a series of computer-executable instructions. These instructions may reside, for example, in the PROM 18 as shown, or in the RAM 20, or in flash memory of the hard disk drive 10.

Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ language code.

FIGS. 2A and 2B illustrate the logical structure of such instructions as embodied in a computer program. Those skilled in the art will appreciate that the figures illustrate the structures of computer program code elements that function according to this invention. Manifestly, the invention is practiced in its essential embodiment by a machine component that renders the computer program code elements in a form that instructs a digital processing apparatus (that is, a computer or microprocessor) to perform a sequence of function steps corresponding to those shown in the Figures. The machine component is shown in FIG. 1 as a combination of program code elements A-D in computer readable form that are embodied in a computer-usable data medium 41 on the PROM 18. As mentioned above, however, such media can also be found in semiconductor devices, on magnetic tape, and on magnetic or optical disks.

Now referring to FIG. 2A, the logic of the present invention as embodied in the saturation module 40 can be seen. Commencing at decision diamond 42, it is determined whether it is time to perform a calibration seek. For example, the logic can cause a calibration seek to be performed periodically, e.g., every ten seconds.

When it is time to conduct a calibration seek, the logic moves to block 44 to perform the seek. In performing a calibration seek, the heads 26 are moved a calibration distance from a predetermined starting track on the disk to a predetermined ending track, with the tracks being identified by means of gray codes or other track identifying data. This calibration distance is sufficient to ensure power amplifier 32 saturation.

Next, at block 46, the predicted distance $X_p$ of head 26 movement during the calibration seek is determined, as is the actual distance $X_m$ of head 26 movement during the seek. To determine the predicted distance $X_p$, the microprocessor 16 uses a head movement model in accordance with principles well-known in the art. On the other hand, to determine the actual distance $X_m$ of head movement, the microprocessor 16 determines the distance actually traveled by the heads 26 by calculating the distance between the starting point of one of the heads 26 relative to the respective disk 22 prior to the seek and the end point of the head 26 relative to the disk 22 at the termination of the seek. To ascertain these points, the microprocessor 16 uses so-called gray code or track identifying data that is contained on a servo portion of the associated disk 22 and that is sensed by the head 26.

From block 46, the logic proceeds to block 48 to determine the actual resistance $R_c$ of the power amplifier 32 using the ratio of the distances calculated at block 46 as follows:

$R_c = R_0 (X_p/X_m)$, wherein $R_0$=nominal saturation resistance of the power amplifier 32.

At block 52, the value of the actual resistance $R_c$ is returned. The process then loops back to decision diamond 42 to await the next calibration seek.

FIG. 2B shows the process that is undertaken for operational seeks subsequent to the calibration seek. These operational seeks occur every servo sample, i.e., every time the heads pass over servo information on a data track. In accordance with well-known principles, when the computer 14 requests data transfer to or from the hard disk drive 10, the microprocessor 16 determines how to move the heads 26, and in so doing calculates a requested current from the power amplifier 32 that is appropriate therefor. Accordingly, at block 53 the saturation current $I_{sat}$ of the power amplifier 32 is determined as follows:

$I_{sat} = \{V_0 \pm Kv\}/R_c$, wherein $V_0$=nominal saturation voltage of the power amplifier 32 and Kv=nominal counter electromotive force (emf) of the power amplifier 32.

Then, at decision diamond 54 in FIG. 2B the logic determines whether the saturated current $I_{sat}$ is greater than the requested current $I_{req}$. If it is, the logic moves to block 56 to cause the microprocessor 16 to use a linear model of power amplifier current to estimate or predict head 26 movement, i.e., to use the requested current $I_{req}$ in the head position linear model. Otherwise, the logic moves to block 58 to cause the microprocessor 16 to use a saturation model of power amplifier current to estimate or predict head 26 movement, i.e., to use the saturation current $I_{sat}$ in the linear model. With the above inventive steps, the present invention uses the appropriate value ($I_{sat}$ or $I_{req}$) for current during seeks, including during head decelerations.

FIGS. 3–6 show alternate embodiments wherein the saturation current of the power amplifier is not determined directly, but instead wherein the current requested of the power amplifier is incrementally decreased when the logic infers power amplifier saturation based on a power amplifier input signal and a power amplifier output signal. In the embodiment shown in FIG. 3, a hard disk drive, generally designated 60, is shown that is in all essential respects identical to the hard disk drive 10 shown in FIG. 1, with the following exceptions.

Input and output signals from a power amplifier 62 are sensed by a circuit, generally designated 64. More specifically, the input signal to the power amplifier 62 from the DAC, which it will be recalled represents the requested current $I_{req}$, is sensed by an input current sensor 66 in accordance with current sensing principles known in the art. Also, the output current $I_{meas}$ of the power amplifier 62 is sensed by an output current sensor 68, and the two currents $I_{req}$ and $I_{meas}$ are sent to a subtractor 70. The subtractor 70 outputs a signal representative of the difference between the two currents $I_{req}$ and $I_{meas}$.

This difference signal is then sent to a comparator 72, which compares it to a threshold value. When the difference signal exceeds the threshold value, the comparator outputs an indication or a signal to a microprocessor 74 indicating that the power amplifier 62 is saturated. Otherwise, the comparator outputs an indication or a signal to the microprocessor 74 indicating that the power amplifier 62 is not saturated.

Figure 3:
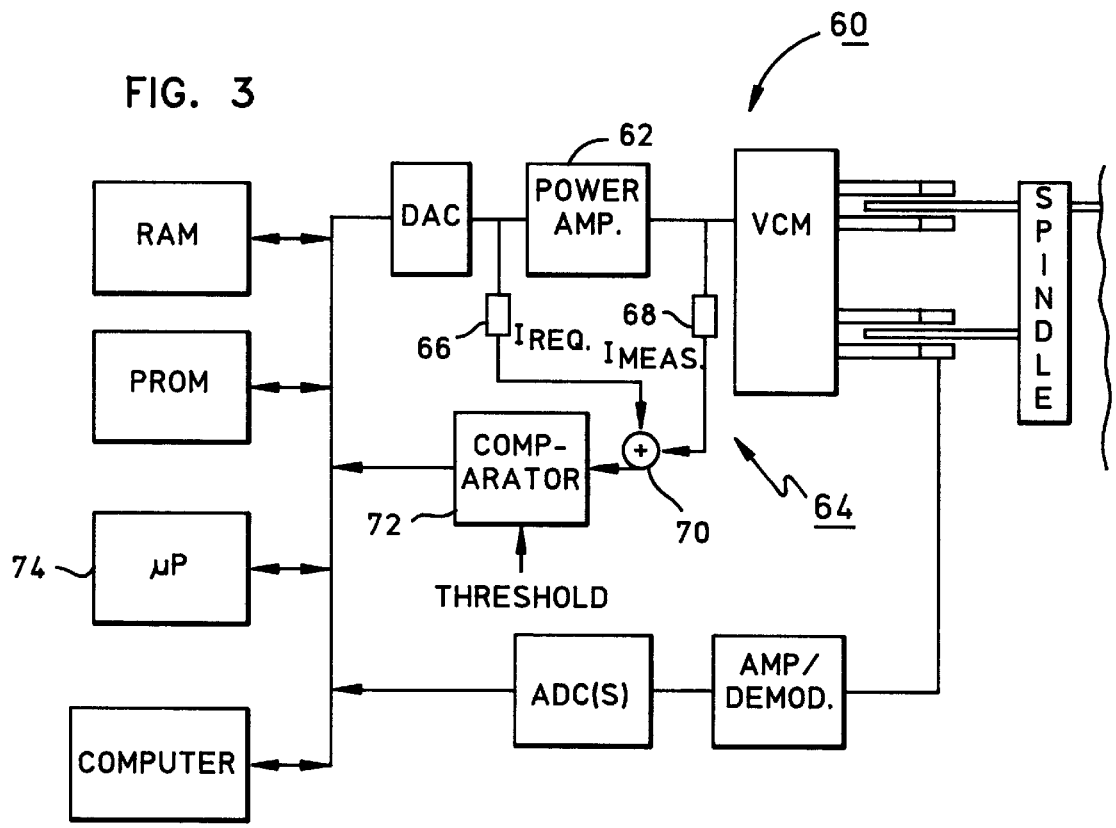
FIG. 3 is a block diagram of an alternate hard disk drive which incrementally decreases the requested current based on the difference between the requested current and the actual current output by the power amplifier.
Figure 4:
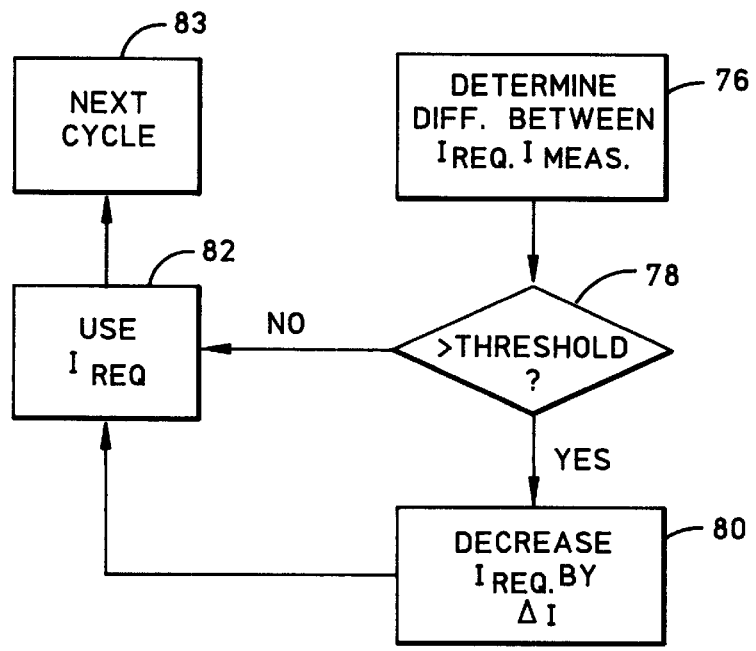
FIG. 4 is a flow chart showing the logic of the hard disk drive shown in FIG. 3.

FIG. 4 shows the logic of the hard disk drive 60 shown in FIG. 3. As mentioned above, at block 76 the subtractor 70 determines the difference between the two currents $I_{req}$ and $I_{meas}$, and at decision diamond 78 the comparator 72 determines whether the difference is greater than the threshold value. If the difference between the two currents $I_{req}$ and $I_{meas}$ is greater than the threshold value, the logic moves to block 80 to decrease the requested current by a predetermined increment $\Delta I$. Then, the process moves to block 82 to use the new requested current $I_{req}$ every servo sample as input to the model for predicting head movement during the seek. From block 82, the process moves to block 83 to await the next seek request. On the other hand, if, at decision diamond 78, it is determined that the difference between the two currents $I_{req}$ and $I_{meas}$ is less than the threshold value, the logic moves to block 82.

Figure 5:
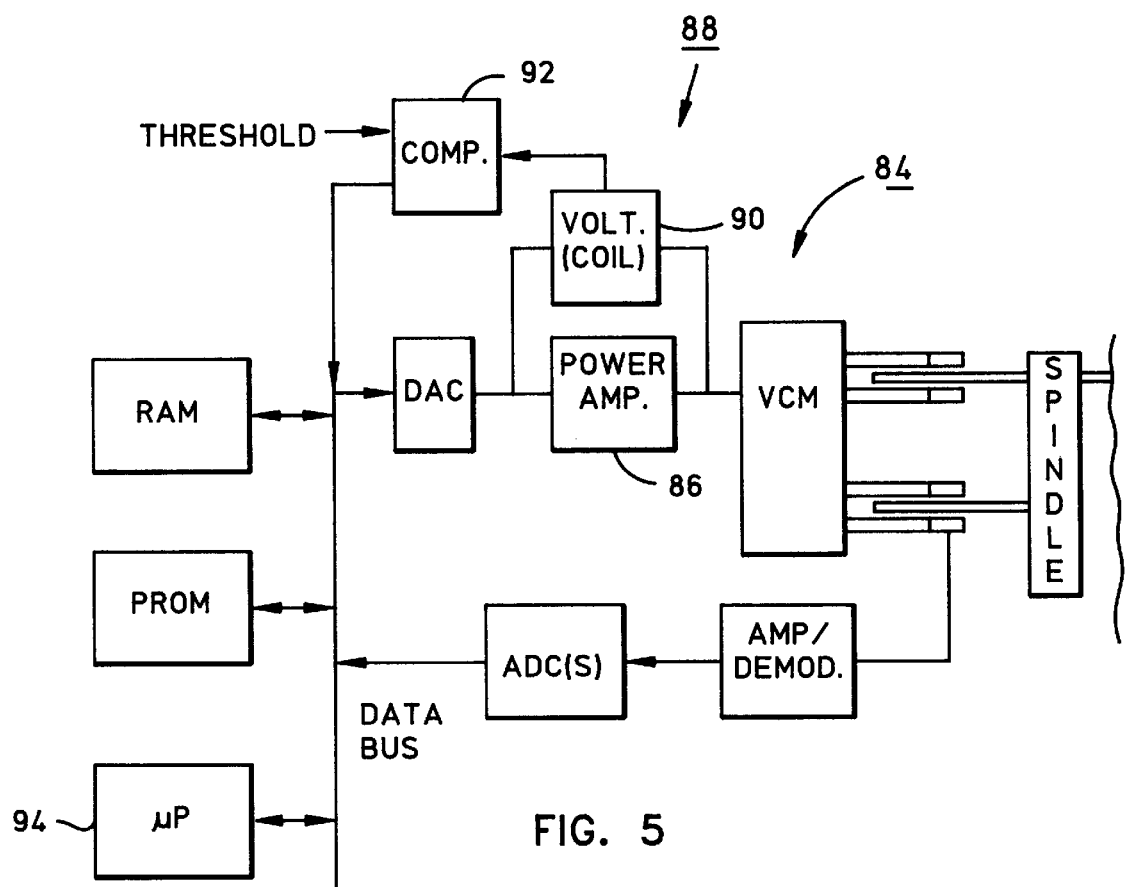
FIG. 5 is a block diagram of yet another alternate hard disk drive which incrementally decreases the requested current based on the voltage across the coil of the power amplifier.
Figure 6:
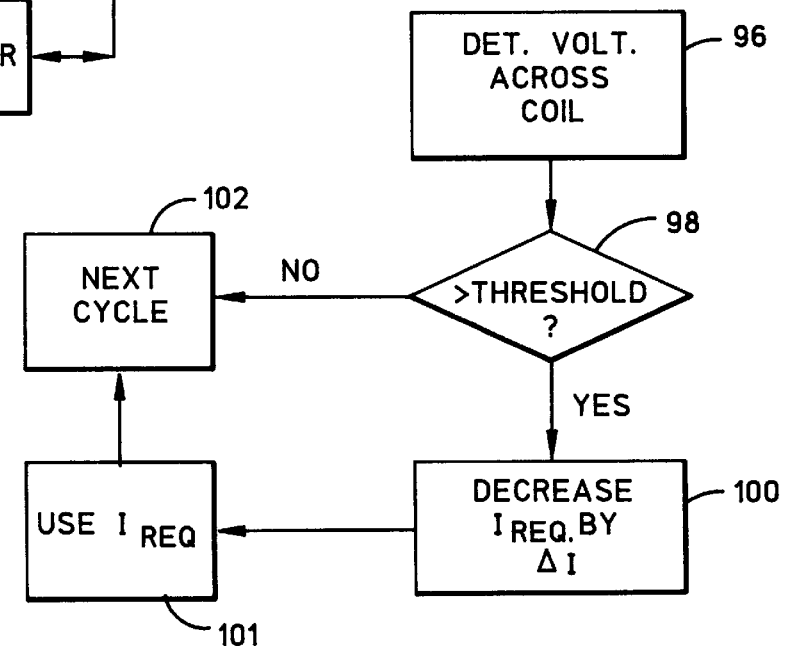
FIG. 6 is a flow chart showing the logic of the hard disk drive shown in FIG. 5.

FIGS. 5 and 6 show that instead of using current to undertake the inferential logic discussed above in relation to FIG. 4, the voltage across a power amplifier can be used. Specifically, a hard disk drive, generally designated 84, is shown that is in all essential respects identical to the hard disk drive 10 shown in FIG. 1, with the following exceptions. Input and output signals from a power amplifier 86 are sensed by a circuit, generally designated 88. More specifically, the voltage across the power amplifier 86 is sensed by a voltage sensor 90 in the circuit 88. The voltage sensor 90 outputs a signal representative of the voltage across the power amplifier 86.

This voltage signal is then sent to a comparator 92, which compares it to a threshold value. When the voltage signal exceeds the threshold value, the comparator 92 outputs an indication or a signal to a microprocessor 94 indicating that the power amplifier 86 is saturated. Otherwise, the comparator 92 outputs an indication or a signal to the microprocessor 94 indicating that the power amplifier 86 is not saturated.

FIG. 6 shows the logic of the hard disk drive 84 shown in FIG. 5. As mentioned above, at block 96 the voltage sensor 90 determines the voltage across the power amplifier 86, and at decision diamond 98 the comparator 92 determines whether the voltage is greater than the threshold value. If the voltage across the power amplifier 86 is greater than the threshold value, the logic moves to block 100 to decrease the requested current by a predetermined increment $\Delta I$. Then, the process moves to block 101 to use, each servo sample, the new requested current $I_{req}$ as input to the model to estimate head movement, and thence to block 102 to await the next seek request. On the other hand, if, at decision diamond 98, it is determined that the voltage across the power amplifier 86 is less than the threshold value, the logic moves to block 102.

While the particular SYSTEM AND METHOD FOR DETERMINING WHEN HARD DISK DRIVE POWER AMPLIFIER IS SATURATED as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A microprocessor for inputting data to a head movement estimation model in a hard disk drive including at least one data storage disk and at least one head juxtaposed with the disk, the hard disk drive also including an actuator connected to the head and a power amplifier coupled to the actuator for energizing the actuator to move the head relative to the disk, the microprocessor comprising:

a data storage device including a computer usable medium having computer usable code for determining whether the power amplifier is saturated, and for:

causing the power amplifier to move the actuator in a calibration seek such that the power amplifier is saturated;

determining a predicted distance of head movement for the calibration seek;

determining an actual distance of head movement for the calibration seek;

determining a saturation current, based on the predicted distance and actual distance;

comparing the saturation current and a requested current of a subsequent data transfer seek; and selecting the requested current for the subsequent data transfer seek in response to the requested current being less than the saturated current, and selecting the saturated current for the subsequent data transfer seek in response to the saturated current being less than the requested current.

2. The microprocessor of claim 1, wherein the microprocessor determines the saturation current using the ratio of the distances.

3. The microprocessor of claim 2, wherein the disk includes data identifying tracks, and the microprocessor determines the actual distance of head movement using the data.

4. The microprocessor of claim 3, wherein the microprocessor determines the saturation current using a nominal saturation voltage and a nominal power amplifier resistance.

5. The microprocessor of claim 1, wherein the saturation current is used during at least some decelerations of the head.

6. The microprocessor of claim 5, in combination with the hard disk drive.

7. The hard disk drive of claim 6, in further combination with a computer electrically connected to the hard disk drive.

8. A computer-implemented method for determining a current value for a head movement estimation model in a hard disk drive including at least one head and a power amplifier for causing the head to move, the method comprising the steps of:

saturating the power amplifier to cause the head to move an actual distance;

determining a predicted distance of the actual distance moved during saturation;

based on a ratio of the predicted distance and the actual distance, determining the current value;

for subsequent data transfer seeks:

in response to a requested current being less than the current value, using the requested current in a subsequent data transfer seek; and in response to the current value being less than the requested value, using the current value in the subsequent data transfer seek.

9. The computer-implemented method of claim 8, wherein the current value is determined by determining a saturation current based on the predicted distance and actual distance.

10. The computer-implemented method of claim 9, wherein the saturation current is determined also using a nominal saturation voltage, and a nominal power amplifier resistance.

11. The computer-implemented method of claim 10, further comprising the steps of:
   determining whether the saturation current is greater than a requested current; and
   selecting a linear model to estimate head movement when the saturation current is greater than the requested current, and otherwise selecting a saturation model.

12. A program device comprising:
   a computer program storage device readable by a digital processing apparatus; and
   a program means on the program storage device and including instructions executable by the digital processing apparatus for performing method steps for determining saturation of a power amplifier in a hard disk drive including a head movement estimation model, at least one head, at least one disk rotatable past the head, and an actuator connected to the head, the method steps comprising:
   causing the power amplifier to move the actuator in a calibrated seek where the power amplifier is saturated;
   determining a predicted distance of head movement for the calibrated seek;
   determining an actual distance of head movement for the calibrated seek;
   determining a saturation current, based on the predicted distance and actual distance; and
   selecting a requested current for a subsequent data transfer seek in response to the requested current being less than the saturated current, and otherwise selecting the saturated current for the subsequent data transfer seek.

13. The program device of claim 12, wherein the saturation current is determined using the ratio of the distances.

14. The program device of claim 13, wherein the disk includes data identifying tracks, and the actual distance of head movement is determined using the data.

15. The program device of claim 14, wherein the saturation current is determined using a nominal saturation voltage and a nominal power amplifier resistance.

* * * * *